United States Patent [19]

Yamazawa et al.

[11] 4,097,996

[45] Jul. 4, 1978

[54] APPARATUS FOR THREE DIMENSIONAL MEASUREMENT

[75] Inventors: Tokumi Yamazawa; Shingo Nishina, both of Kawasaki, Japan

[73] Assignee: Mitutoyo Mfg., Co., Ltd., Tokyo, Japan

[21] Appl. No.: 750,186

[22] Filed: Dec. 13, 1976

[30] Foreign Application Priority Data

Feb. 4, 1976 [JP] Japan .............................. 51-12154[U]

[51] Int. Cl.² .............................................. G01B 5/02
[52] U.S. Cl. .................................. 33/1 M; 33/172 R; 33/174 R
[58] Field of Search ................. 33/1 M, 169 R, 172 R, 33/172 E, 174 R, 174 L

[56] References Cited

U.S. PATENT DOCUMENTS

| | | | |
|---|---|---|---|
| 3,701,199 | 10/1972 | Lewis | 33/1 M |
| 3,803,719 | 4/1974 | Nishina | 33/172 R |
| 3,864,834 | 2/1975 | Horton | 33/169 R |

FOREIGN PATENT DOCUMENTS

| | | | |
|---|---|---|---|
| 230,727 | 4/1944 | Switzerland | 33/169 R |
| 425,247 | 5/1967 | Switzerland | 33/169 R |
| 535,838 | 4/1941 | United Kingdom | 33/169 R |

*Primary Examiner*—Richard E. Aegerter
*Assistant Examiner*—Richard R. Stearns
*Attorney, Agent, or Firm*—Koda and Androlia

[57] ABSTRACT

An apparatus for three dimensional measurement may be fabricated by combining three pairs of beam members along three mutually orthogonal directions. Each beam member has a rack formed on the inside surface which mates with a pinion gear. The rack of one beam member engages a driving means which displaces a movable member which is disposed on the pair of beam members. The rack of the other beam member engages a measurement device which records the amount of displacement. Thus, an apparatus for measurement of three dimensions may be fabricated which is stable, resistent to wear and easy to operate.

3 Claims, 4 Drawing Figures

APPARATUS FOR THREE DIMENSIONAL MEASUREMENT

BACKGROUND OF THE INVENTION

1. Field of Invention

The present invention relates to the field of apparatus for three dimensional measurement, which apparatus include columns or rods disposed along mutually intersecting X, Y and Z axes.

2. Description of the Prior Art

Conventional apparatus for three dimensional measurement are typically constructed from columns disposed along three mutually intersecting axes. These columns are each equipped with some type of micrometer scale. The object to be measured is measured by combining the readings of the scales on the X, Y and Z axes.

However, such prior art devices have suffered from the following drawbacks: (1) A substantial amount of practice is required in order to read the scales quickly and accurately; and (2) The columns must be precisely straight in order to provide an accurate measurement and must be maintained at precise angles. However, prior art columns are usually single columns for each axes, thus the columns become warped and measurement accuracy is reduced.

Although recent years have seen the development of electronic devices for three dimensional measurement without the recourse to micrometer or other mechanical scales, these devices are of such complexity that they may be fabricated only at substantially increased costs over their mechanical counterparts having the same accuracy. Therefore, what is needed is to eliminate each of these conventional, technological drawbacks and to provide an apparatus for three dimensional measurement which may be operated quickly, accurately and without undue need for high operator skill or cost.

BRIEF SUMMARY OF THE INVENTION

The present invention is an apparatus for measurement along at least one dimension comprising at least a pair of mutually parallel beam members disposed along the dimension. A movable member is disposed on the beam members. A first means for displacing the movable members with respect to the beam members is coupled to at least one of the beam members. Finally, a second means for measuring displacement of the movable member with respect to the beam members is coupled to at least one of the beam members other than the beam member coupled to the first means.

The above apparatus may be modified for a three dimensional measurement by combining three pairs of mutual parallel beam members, each pair oriented along a direction perpendicular to each of the other two pairs. Two movable members may be associated with two of the three pairs of beam members, each pair of beam members having a corresponding one of said first and second means. In such a configuration, the second pair of beam members may be coupled to a first movable means while the third pair of beam members is coupled to a second movable member.

The present invention and its various embodiments may be better understood by viewing FIGS. 1 through 4.

DETAILED DESCRIPTION OF THE PREFERRED EMBODIMENTS

The present invention is a device for three dimensional measurement which includes a first set of beam members, typically a pair of beam members each having a rack on its inside surface. A first movable member is disposed or mounted on the first set of beam members so that it can move or be displaced along the axis to which the beam members are parallel. A second set of beam members, also comprised of a pair of beam members, is mounted vertically on the first movable member at right angles to the first set of beam members. Each of the beam members of the second set of beam members has a rack on its inside surface. A second movable member is mounted or disposed on the second set of beam members such that it can move or be displaced with respect to the second set of beam members and along an axes to which the second set of beam members is parallel. A third set of beam members also consisting of a pair of beam members, each having a rack on their inside surface, is mounted or disposed on the second movable member so that they are parallel to an axis which is mutually orthogonal to the orientation of the first and second set of beam members. The third set of beam members is displaceable in a direction parallel to its own length or a third mutually orthogonal axis. A measuring element or means may be attached to one end of the third set of beam members. The first and second movable members, disposed on the first and second set of beam members are each provided with a first means or gear mechanism for displacing the respective movable member with respect to the corresponding set of beam members. The first means engages the rack of one of the two beam members. The first and second movable members disposed on the first and second set of beam members are also each provided with a second means or gear mechanism for measuring the displacement of the corresponding movable member with respect to the associated beam members, which mechanism or means operates a dial gauge and engages the rack of the other beam member.

Figure 1:
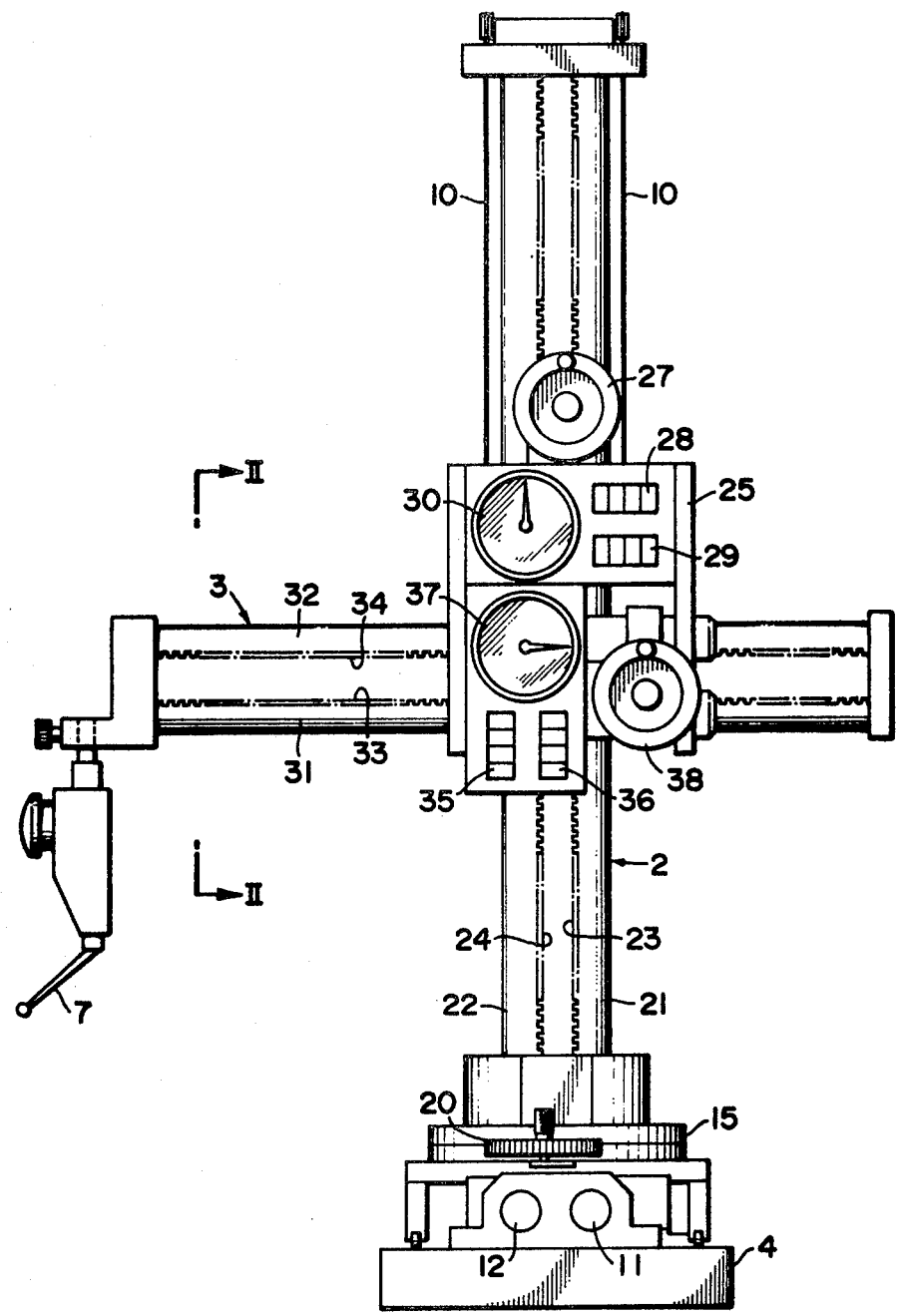
FIG. 1 is a side view of the apparatus showing three mutually orthogonal beam members arranged and configured according to the present invention.
Figure 2:
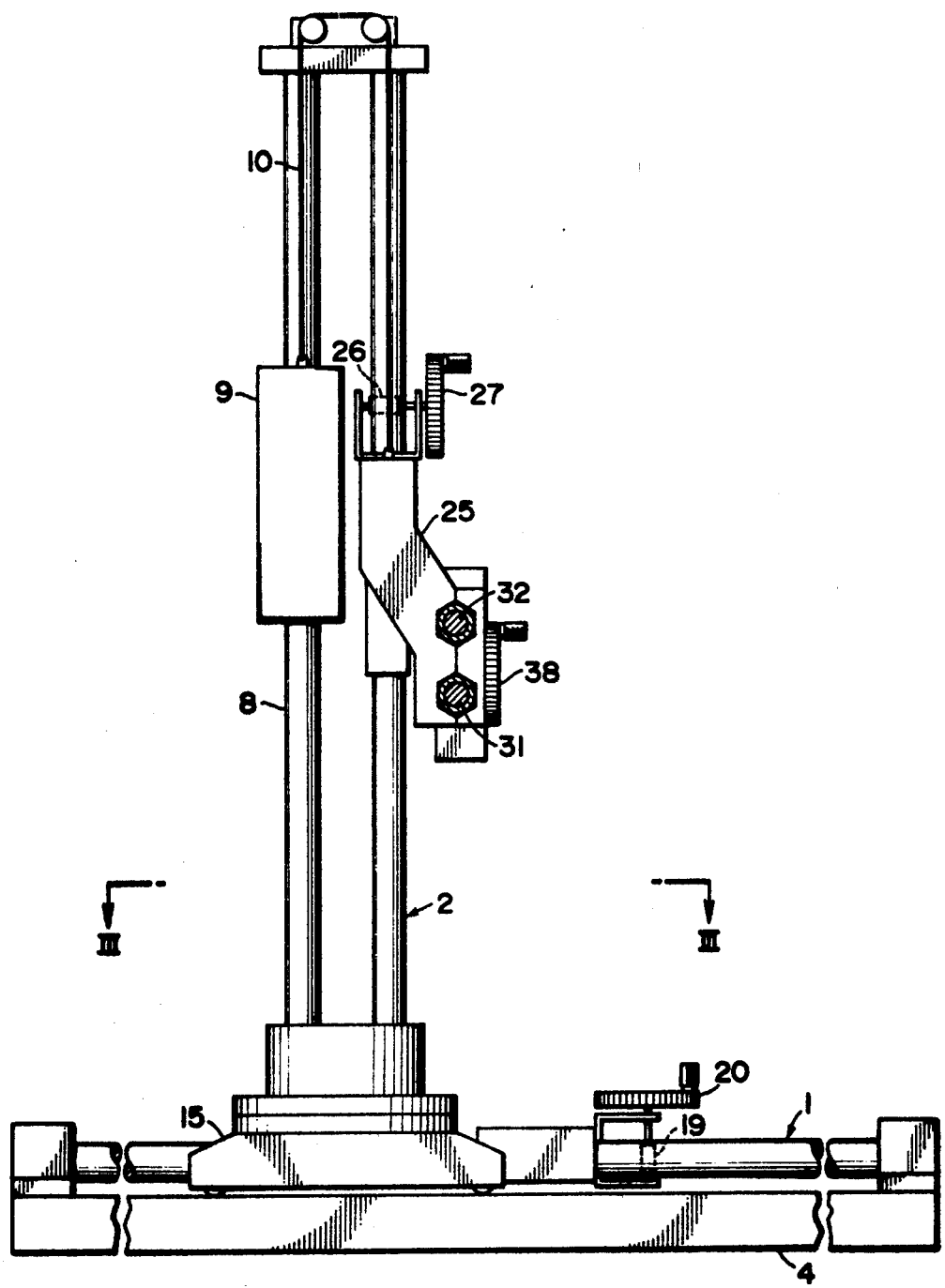
FIG. 2 is the view of the present invention from another side taken through section II—II of FIG. 1.
Figure 3:
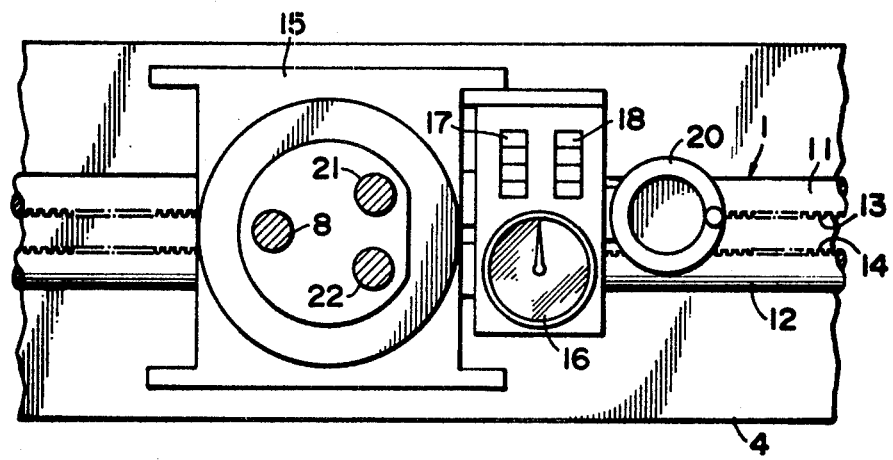
FIG. 3 is a plan view of the present invention taken through section III—III of FIG. 2.

In particular, viewing FIG. 2, the apparatus includes a first set or pair of beam members 1 which forms the X axis. A second set or pair of beam members 2 forms the Z axis. Finally, a third set of beam members 3 (FIG. 1) forms the Y axis. The first set of beam members 1, which forms the X axis, is mounted on a level base 4. Base 4 is typically a machined plate having end members which suitably engage beam members 1. Any base well known to the art may be used and the particular base which is illustrated is only shown for the purposes of clarification. Each of the beam members 11 and 12 of the first set of beam members 1 has a rack 13 and 14 disposed or formed along the length of its inside surface as seen best in FIG. 3. In the embodiment illustrated, racks 13 and 14 are integrally formed in the inside surface of each of the beam members 11 and 12 which are shown as solid rods. It is to be understood that racks 13 and 14 may be of any form well known to the art including, but not limited to, separate rack fixtures coupled to each of the beam members and need not be disposed only on the inside surface of the beam members. In addition, the beam members may assume any form well known to the art, including hollow or solid squares, triangles or other prismatic shapes.

Figure 4:
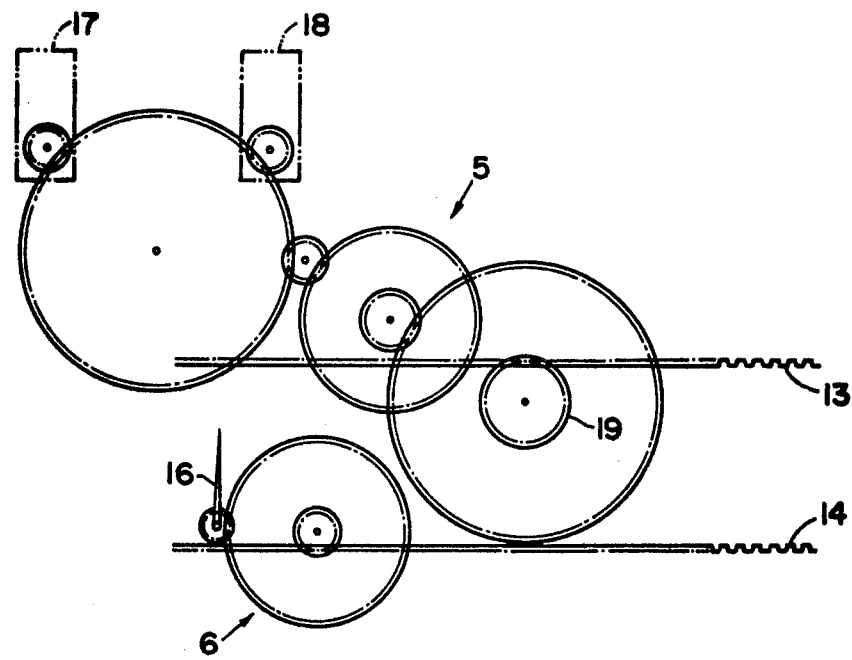
FIG. 4 is a simplified diagramatic view of one embodiment of the gear train mechanism included within the movable member of FIG. 3.

A first slide member 15 is mounted or disposed on the first set or pair of beam members 1 so that it can move or be displaced along the length of the first set of beam members 1 in a direction parallel to their orientation. First slide member 15 is equipped with a first means 16 for measuring displacement of the movable member with respect to the beam members 1. Typically, such a means includes a micrometer or dial gauge, well known to the art, as diagramatically illustrated in FIG. 4. In addition, first movable means 15 includes two counters 17 and 18 (FIG. 4) well known to the art. Futhermore, as is shown in FIG. 4, a feed pinion gear 19 engages one rack 13 of the aforementioned first set of beam members 1. Feed pinion gear 19 also engages, in the embodiment illustrated, counters 17 and 18 via an appropriate gear mechanism 5 diagramatically illustrated in FIG. 4. It is to be understood, however, that many other gear mechanisms and means for coupling between counters 17 and 18 and pinion gear 19 may be employed. Of the two counters 17 and 18, one counter, such as 17, is used to measure and indicate gross displacements along the positive direction of the X axis while the other counter 18 is used to indicate and measure gross displacements along the negative direction. Counters 17 and 18 may be of any form well known to the art and this unidirectional counting feature may be accomplished by a ratchet and a prawl combination or any other equivalent means. Rack 14 of the first set of beam members 1 engages a gear on second means or dial gauge 16 via an appropriate gear mechanism 6, as diagramatically shown in FIG. 4. Again, any means for coupling dial gauge 16 with beam member 12 well known to the art may be employed. Finally, feed handle 20 is coupled to feed pinion gear 19 and provides a manual wheel and lever combination by which pinion gear 19 may be manually rotated to obtain the desired displacement of first movable means 15 with respect to first set of beam members 1.

A second set or pair of beam members 2, forming the Z axis, is mounted on first movable means 15 as shown in FIG. 2 and is perpendicularly oriented with respect to the X axis or the orientation of the first set of beam members 1. The second set of beam members 2 is comprised of at least two beam members 21 and 22 having a substantially identical configuration as beam members 11 and 12. Each of these beam members 21 and 22 have a rack 23 and 24 similarly disposed or formed along the length of its inside surface. A second movable member 25 is mounted or disposed on this second set of beam members 2 so that movable member 25 may move or be displaced along the length of the second set of beam members 2. A third set or pair of beam members 3, forming the Y axis, is mounted or coupled to second movable member 25. This third set of beam members 3, which is comprised of at least two beam members 31 and 32 is oriented so as to be mutually perpendicular to the X and Z axes and is so coupled to second movable member 25 such that it may collectively be displaced along the axis of its own length, the Y axis, relative to second movable member 25. The upper portion of second movable member 25 is similarly equipped with a feed handle 27 to which a feed pinion gear 26 is attached. Feed pinion gear 26 also engages rack 23 of second set of beam members 2. Pinion gear 26 is designed and associated with a gear mechanism in substantially the same manner as was pinion gear 19 of first movable member 15, diagramatically shown in FIG. 4. It is to be understood that various minor modifications and alterations may be made with those having ordinary skill in the art to the manner in which feed handle 27 is coupled to pinion gear 26 in order to displace second movable means 25 along second set of beam members 2. As was the case with first movable member 15, second movable member 25 includes two counters 28 and 29, typically coupled to rack 23 to selectively measure gross displacements of positive and negative displacement of movable member 25 with respect to its corresponding pair of beam members. As was the case with respect to first movable member 15 shown in FIG. 4, rack 24 of the second set of beam members 2 engages a gear which is ultimately coupled, as shown by example in FIG. 4, to a means for measuring displacement of the movable member with respect to its corresponding set of beam members, such as a dial gauge 30 or other micrometer gauges well known to the art.

Each of the two beam members 31 and 32, forming the third set of beam members 3 has a rack 33 and 34 disposed or formed along the length of its inside surface. One rack 33 engages a feed pinion in the same manner as described above which is disposed and coupled to second movable member 25 in substantially the same manner as the mechanism shown diagramatically in FIG. 4. This feed pinion gear is coupled, similarly to that as shown in FIG. 4, to two counters 35 and 36. Rack 34 of third set of beam members 3 engages an appropriate gear mechanism, again similar to that shown in FIG. 4, to operate a means for measuring displacement such as a dial gauge 37. Finally, feed handle 38 is coupled to the driving pinion gear of third set of beam members 3 and provides a means whereby the third set of beam members 3 may be displaced with respect to movable member 25. In one embodiment, a probe or measuring member 7 may be coupled or disposed at one end of third set of beam members 3 and provides a convenient means for contact to the object to be measured.

Referring again to FIGS. 2 and 3, a guide column 8 is shown as mounted vertically on first movable member 15 and oriented in a substantially parallel direction to second set of beam members 2. Typically, guide column 8 is disposed with respect to beam members 21 and 28 such that it lies on the perpendicular bisector of a line connecting the center of beam members 21 and 22. A counterweight 9 is coupled to movable member 25 as shown in FIG. 2. Counterweight 9 is mounted or disposed on guide column 8 such that it is free to slide or be displaced along the length of guide column 8. Two flexible strands or wires 10 are coupled to the top of counterweight 9. Wires 10 are directed by means of a double pulley illustrated in FIG. 2, and well known to the art, at the upper end of second set of beam members 2. Wires 10 ultimately change direction by 180° at the top of guide column 8 and second set of beam members 2 and have their other ends coupled to second movable member 25. Thus, second movable member 25 is constantly pulled upward by the weight of counterweight 9, which weight is selected to be substantially equal to the weight of the second movable member 25, the third set of beam members 3 and all associated means and mechanisms. Therefore, by virtue of this counterweight means, the net force upon second movable member 25 is substantially zero, thereby increasing its stability and sensitivity, and reducing wear.

The operation of the present invention may be understood by the following. Feed handle 20 disposed on first movable member 15 is rotated to cause the third set of beam members 3, forming the Y axis, and the second set of beam members 2, forming the Z axis, to be displaced along the direction of the first set of beam members 1, forming the X axis. Furthermore, rotating feed handle 27 causes the third set of beam members 3, forming the Y axis, to move or be displaced upward or downward along the second set of beam members 2, forming the Z axis. Rotation of feed handle 38 causes the third set of beam members 3, forming the Y axis, to move along the direction of the Y axis relative to second movable member 25.

It is to be particularly noted that since each feed handle has an associated feed pinion gear which engages one rack of each of the set or pair of beam members and since these feed pinion gears also engage counters, the amount of movement or displacement along each axis can be easily measured by each counter. Furthermore, the remaining rack of each set of beam members engages a micrometer dial gauge, gear mechanism and pinion combination such that the amount of movement along each axis may be measured with a high degree of precision. Finally, since the racks for feed and counter operation and the racks for dial gauge operation are each independent and separately disposed on distinct beam members in each axis, the racks operating the dial gauges, which require a high degree of precision, are not subjected to the same amount of wear or demand tolerances as the opposing corresponding one of the pair of beam members. Accordingly, a rugged device is built which is both economically fabricated and provides a high degree of accuracy by use of dial gauge measurement without loss of precision over a long period of usage.

Furthermore, since in the illustrated embodiment, the second movable member 25, which supports third set of beam members 3, is suspended by a counterweight 9, the combined weight of the second movable member 25 and the third set of beam members 3 are cancelled by counterweight 9 such that rack 23 is not highly stressed, thus avoiding deformation and excessive wear. In addition, since each axis includes at least two beam members, the beam members as a pair are not easily warped and precision measurements are preserved under a wide variety of thermal conditions, rough handling and prolonged usage.

Thus, the present invention possesses the advantage of not requiring any high degree of training in order to use it, and of being able to measure the three dimensional extent of an object quickly and with a high degree of accuracy.

Although the present invention has been described, in particular, with respect to a mechanical rack and pinion gear engagement between the measuring means and the beam member, it is to be understood that this is by way of example only, and any means of accurately coupling a measuring means and one of a pair of beam members may be employed. Further modifications and alterations may be made in this and the other aspects of the present invention without altering or departing from the spirit and scope.

We claim:

1. An apparatus for measurement in three dimensions comprising:
    a first pair of mutually parallel beam members oriented along a first axis, said first pair of beam members each having a rack gear disposed on the inside surface of said members;
    a first movable member slidably disposed on said first pair of beam members;
    a second pair of mutually parallel beam members mounted on said first movable member and disposed along a second axis, said second pair of beam members each having a rack gear disposed on the inside surface of said beam members;
    a second movable member slidably disposed on said second pair of beam members;
    a third pair of mutually parallel beam members slidably disposed on said second movable member and disposed along a third axis, said third pair of beam members each having a rack gear disposed on inside surface of said beam members; and
    said first and second movable members, each further including first means for displacing said movable member with respect to the corresponding pair of beam members by engaging the rack gear of one of said corresponding beam members, and each said first and second movable member further including second means for measuring displacement of said movable member with respect to said corresponding pair of beam members by engaging the rack gear of the other one of said corresponding beam members.

2. The apparatus of claim 1 wherein said first, second and third axes are mutually perpendicular, said second pair of beam members being vertically oriented, and counterweight means being coupled to said second movable member for compensating the force of gravity exerted upon said second movable member, said counterweight means including a counterweight slidably mounted on a vertical beam disposed on said first movable member in parallel to said second pair of beam members.

3. The apparatus of claim 1 wherein said second means each further includes counter means for measuring displacement with respect to said corresponding pair of beam members.

* * * * *